(12) United States Patent
Moreno et al.

(10) Patent No.: US 9,379,888 B2
(45) Date of Patent: Jun. 28, 2016

(54) POWERLINE COMMUNICATION NETWORK ANALYZER

(71) Applicant: QUALCOMM Incorporated, San Diego, CA (US)

(72) Inventors: Francisco Javier Moreno, Ocala, FL (US); Purva Rameshchandra Rajkotia, Orlando, FL (US); Phuoc Nhu Tang, Sanford, FL (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 14/264,454

(22) Filed: Apr. 29, 2014

(65) Prior Publication Data

US 2015/0163052 A1 Jun. 11, 2015

Related U.S. Application Data

(60) Provisional application No. 61/913,124, filed on Dec. 6, 2013.

(51) Int. Cl.
| H04K 1/00 | (2006.01) |
| H04L 9/08 | (2006.01) |
| H04B 3/54 | (2006.01) |

(52) U.S. Cl.
CPC ............... *H04L 9/0816* (2013.01); *H04B 3/54* (2013.01)

(58) Field of Classification Search
USPC ........................................................ 380/255
See application file for complete search history.

(56) References Cited

U.S. PATENT DOCUMENTS

| 5,812,557 | A | * | 9/1998 | Stewart | ................... | G01R 31/42 370/252 |
| 6,854,059 | B2 | | 2/2005 | Gardner | | |
| 7,590,844 | B1 | * | 9/2009 | Sherman | ................ | H04L 9/0827 380/255 |
| 7,761,079 | B2 | | 7/2010 | Mollenkopf et al. | | |
| 7,865,184 | B2 | | 1/2011 | Ayyagari et al. | | |
| 7,982,596 | B2 | | 7/2011 | Curt et al. | | |
| 2005/0071678 | A1 | * | 3/2005 | Lee | ...................... | H04L 63/0428 726/4 |
| 2006/0038660 | A1 | * | 2/2006 | Doumuki | ................ | H04B 3/542 380/42 |
| 2006/0071776 | A1 | * | 4/2006 | White | .................. | H02J 13/0086 340/538 |
| 2014/0016482 | A1 | * | 1/2014 | de Silva | ................. | H04L 43/026 370/250 |
| 2014/0172723 | A1 | * | 6/2014 | Borisov | .................. | H04B 3/546 705/76 |
| 2014/0337843 | A1 | * | 11/2014 | Delamare | .............. | H04B 3/542 718/1 |

FOREIGN PATENT DOCUMENTS

WO 2012049363 4/2012

OTHER PUBLICATIONS

R. Newman, L. Yonge, S. Gavette and R. Anderson "HomePlug AV security mechanisms" Proc. IEEE Int. Symp. Power Line Commun. Appl., pp. 366-371, 2007.*
Paruchuri, V.; Durresi, A.; Ramesh, M., "Securing powerline communications," in Power Line Communications and Its Applications, 2008. ISPLC 2008. IEEE International Symposium on, vol., no., pp. 64-69, Apr. 2-4, 2008.*
"Homeplug GP Specification" Ch. 7, 2012.*

* cited by examiner

*Primary Examiner* — Christopher Revak
*Assistant Examiner* — Vadim Savenkov
(74) *Attorney, Agent, or Firm* — DeLizio Law, PLLC (57) ABSTRACT

A powerline communication (PLC) network analyzer can join a PLC network by authenticating and associating with a central coordinator of the PLC network. The network analyzer can receive an encryption key from the central coordinator and dissociate from the PLC network. The network analyzer can capture and decrypt network traffic from the PLC network while remaining dissociated. The network analyzer can also create one or more virtual stations for the PLC network. The virtual stations can join the PLC network through the central coordinator and generate network traffic for the PLC network.

20 Claims, 4 Drawing Sheets

POWERLINE COMMUNICATION NETWORK ANALYZER

RELATED APPLICATIONS

This application claims the priority benefit of U.S. Provisional Patent Application Ser. No. 61/913,124 filed on Dec. 6, 2013.

BACKGROUND

Embodiments of this disclosure generally relate to the field of communication systems and, more particularly, to a network analyzer for powerline communication systems.

A local network can convey network traffic between a user device, such as a desktop or laptop computer, and another network, such as a broadband network. The local network can thereby link the user device to data and services such as Internet-based services and web servers. Local networks often use traditional Ethernet-based network systems. These network systems use a dedicated cable to carry the network traffic to and from the user device. However, in some environments, adding the dedicated cable to provide communications may not be desirable or feasible.

Powerline communication (PLC) technology uses existing power lines to form a PLC network and carry network traffic in addition to carrying alternating current (AC) power. The network traffic is coupled to the power lines through specialized PLC devices. Analyzing PLC devices, PLC networks, and the network traffic can present various challenges due, in part, to operational restrictions of the PLC devices.

SUMMARY

Various embodiments of a PLC network analyzer are disclosed. In some embodiments, the PLC network analyzer can receive an encryption key from a central coordinator of the PLC network in response to joining the PLC network. The PLC network analyzer can then dissociate from the PLC network. The PLC network analyzer can capture network traffic from the PLC network after dissociating from the PLC network and can decrypt the network traffic using the encryption key.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present disclosure. However, it is understood that the described embodiments may be practiced without these specific details. For instance, although examples refer to networks and devices that implement a HomePlug® powerline communication specification (e.g., HomePlug, HomePlug AV, HomePlug AV2, HomePlug Green PHY), any other technically feasible powerline communication technology can be used (e.g., G.hn, G.hn-MIMO). In other instances, well-known instruction instances, protocols, structures, and techniques have not been shown in detail in order not to obfuscate the description.

A PLC network can communicatively couple two or more PLC devices through power lines that may be used as a communication medium (which may also be referred to as a powerline medium). A PLC device can include a PLC interface to convey network traffic to and from the powerline medium. The PLC network can include various types of PLC devices, such as a central coordinator (CCo) and at least one station (STA). The CCo can perform high-level network management functions such as sending beacon transmissions to synchronize and control PLC network activity. The CCo can also control admission of other PLC devices (e.g., membership) to the PLC network.

The network traffic, including management and data packets, can be encrypted with an encryption key. The PLC devices that are members of the PLC network can possess a suitable encryption key that enables decrypting the network traffic. For example, when a PLC device joins a PLC network, the PLC device can receive an encryption key specific to the PLC network. The encryption key can be used to decrypt the network traffic, while preventing non-member PLC devices from decrypting the network traffic. Encrypting the network traffic can typically ensure that the network traffic is only available to the PLC devices that are members of the PLC network.

While the network traffic between the CCo and the STA can be a broadcast communication (e.g., data that is transmitted simultaneously to a plurality of PLC devices), more often the network traffic is a unicast communication. The unicast communication includes data packets that are sent from a first PLC device to a second PLC device. The unicast communication can also include a destination address, such as a media access control (MAC) address, to identify the second PLC device. In a shared communication medium, such as a powerline medium, multiple PLC devices can receive the unicast communication. If a PLC device receives a unicast communication with a destination address that does not match its own device address, then the unicast communication is ignored. However, if a PLC device receives a unicast communication with a destination address that matches its own device address, then the unicast communication can be processed. Thus, the destination address is used to determine the recipient of the unicast communication.

Encrypting the network traffic and using the destination address to specify a receiving PLC device can typically secure the network traffic from unintended recipients. For example, unless the receiving PLC device has the device address that matches the destination address included in the unicast communication, the receiving PLC device will ignore (i.e., not capture or process) the network traffic. Even if the receiving PLC device captures the network traffic, without the encryption key the receiving PLC device cannot decrypt the network traffic.

However, the operations described above can increase the difficulty of capturing and analyzing the network traffic associated with the PLC network. The capture and analysis of the network traffic can be used to assess PLC network performance, verify functionality of a PLC device, and/or help diagnose interference from other PLC networks. Since a PLC device can typically only receive the network traffic from a particular PLC network, the PLC device may not have access to network traffic from other PLC networks and, therefore, may not be able to provide a complete analysis.

In one embodiment, a network analyzer can join the PLC network through the CCo. As a member of the PLC network, the network analyzer can receive an encryption key enabling the network analyzer to capture and decrypt the network traffic. The network analyzer can dissociate from (leave) the PLC network and retain a copy of the encryption key. The network analyzer can continue to receive and decrypt network traffic without being a member of the PLC network. In one embodiment, the network analyzer can capture substantially all the network traffic, including unicast communications that are not transmitted to the network analyzer. The network analyzer can analyze the captured network traffic to, among other things, assess PLC network performance, verify PLC device performance, and identify interference sources in the PLC network. The operation of the network analyzer including capturing the network traffic will be described in more detail below in conjunction with FIGS. 1-2.

In another embodiment, the network analyzer can create one or more virtual stations. The virtual stations can join the PLC network through the CCo. Network traffic generated by the virtual stations can be transmitted by the network analyzer. The virtual stations can be configured to interact with one or more of the PLC devices in the PLC network. For example, the virtual stations can generate the network traffic to test other PLC devices in the PLC network. The operation of the network analyzer including the creation of the virtual stations will be described in more detail below in conjunction with FIGS. 1 and 3.

Figure 1:
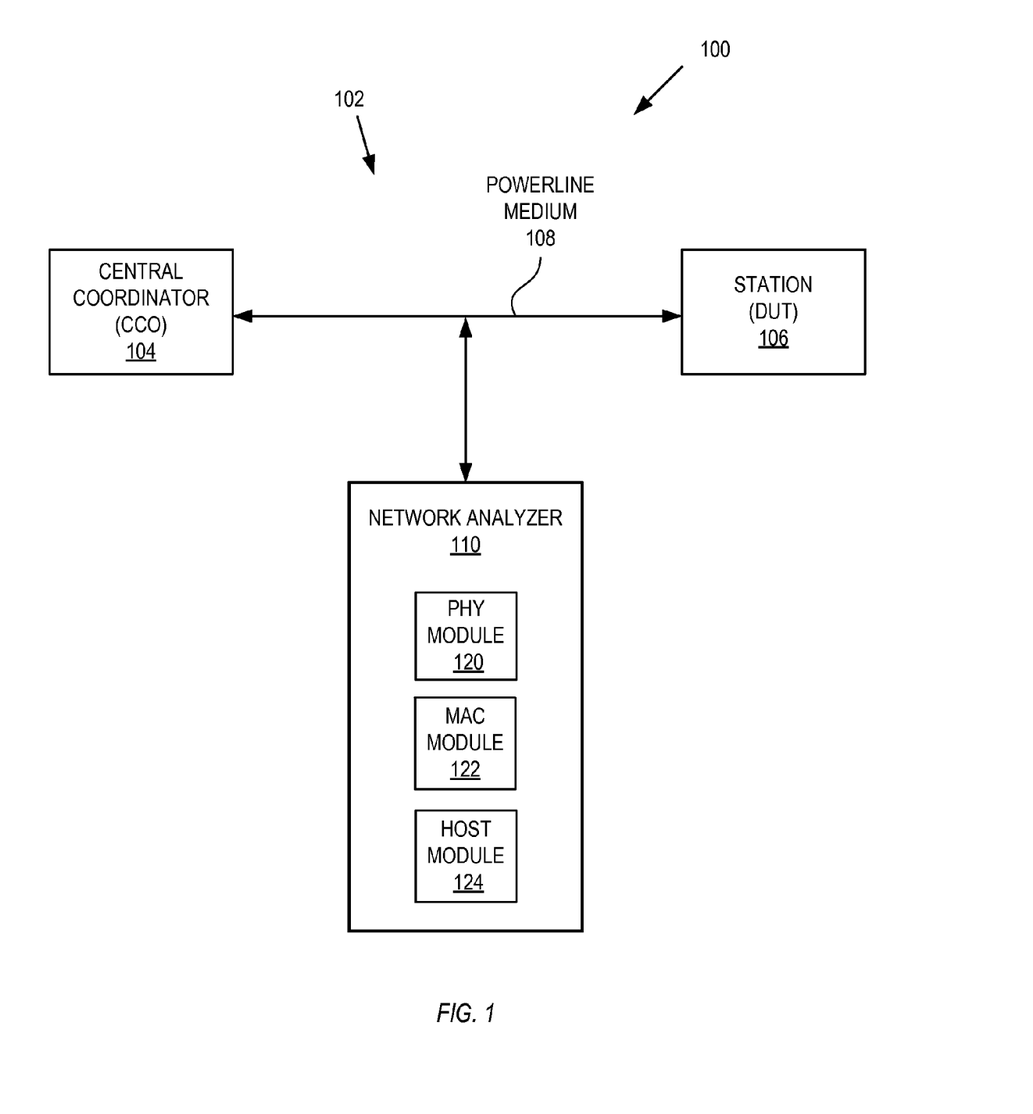
FIG. 1 is a block diagram of an example powerline communication network.

FIG. 1 is a block diagram 100 of an example PLC network 102. In one embodiment, the PLC network 102 can be configured to implement a specification such as a HomePlug, a HomePlug AV, a HomePlug AV2, a HomePlug Green PHY, an IEEE 1901 specification, or other technically feasible PLC specification. For example, the PLC network 102 can implement an audio-video logical network (AVLN) as described by the HomePlug AV specification. The PLC network 102 can include a CCo 104 and a STA 106. The PLC network 102 can include a powerline medium 108 capable of carrying alternating current power and can also be used as a communication medium. The CCo 104 and the STA 106 can each couple to the powerline medium 108.

In one embodiment, the CCo 104 can be a STA that has been configured to operate as the CCo 104 of the PLC network 102. In other embodiments, the CCo 104 can be a dedicated CCo, such as a gateway for the PLC network 102. The CCo 104 can provide network management functions for the PLC network 102. For example, the CCo 104 can control admission of STAs to the PLC network 102. Generally, for a STA to become a member of a PLC network, the STA associates and authenticates with the CCo 104. After authentication, the STA can receive an encryption key from the CCo 104 that can enable the STA to transmit and receive network traffic through the PLC network 102.

For example, the STA 106 can associate and authenticate with the CCo 104 and become a member of the PLC network 102. After authentication, the STA 106 can receive an encryption key and can transmit and receive the network traffic through the PLC network 102. For example, the STA 106 can transmit the network traffic to the CCo 104 using the encryption key. A user may wish to verify the performance of a new or unknown STA in the PLC network 102. The new or unknown STA can be referred to as a device under test (DUT). The CCo 104 can transmit and receive network traffic to and from the DUT (e.g., STA 106) to determine network performance, adherence to powerline specifications, or other performance aspects related to the DUT.

The PLC network 102 can also include a network analyzer 110. The network analyzer 110 can couple to the powerline medium 108. The network analyzer 110 can join the PLC network 102 through the CCo 104; however, instead of functioning as another STA, the network analyzer 110 can capture and decrypt the network traffic transmitted within the PLC network 102. In one embodiment, the network analyzer 110 can capture and decrypt the network traffic transmitted between the CCo 104 and the STA 106 including unicast communications not directed to the network analyzer 110, as will be further described below.

The network analyzer 110 can include a media access control (MAC) unit 122 and a physical (PHY) module 120. The PHY module 120 can provide a physical interface between the network analyzer 110 and the powerline medium 108. For example, PHY module 120 can include elements and components used to couple to the network analyzer 110 to the powerline medium 108. The MAC module 122 can provide an interface between the PHY module 120 and higher level units (such as a host module 124) in the network analyzer 110 that receive or generate the network traffic. Thus, the host module 124 can receive and analyze the network traffic from the MAC module 122. The host module 124 can also generate network traffic to analyze the performance of the PLC network 102. In one embodiment, the host module 124 can be implemented partially, or entirely, by a host program executed by the network analyzer 110.

Figure 2:
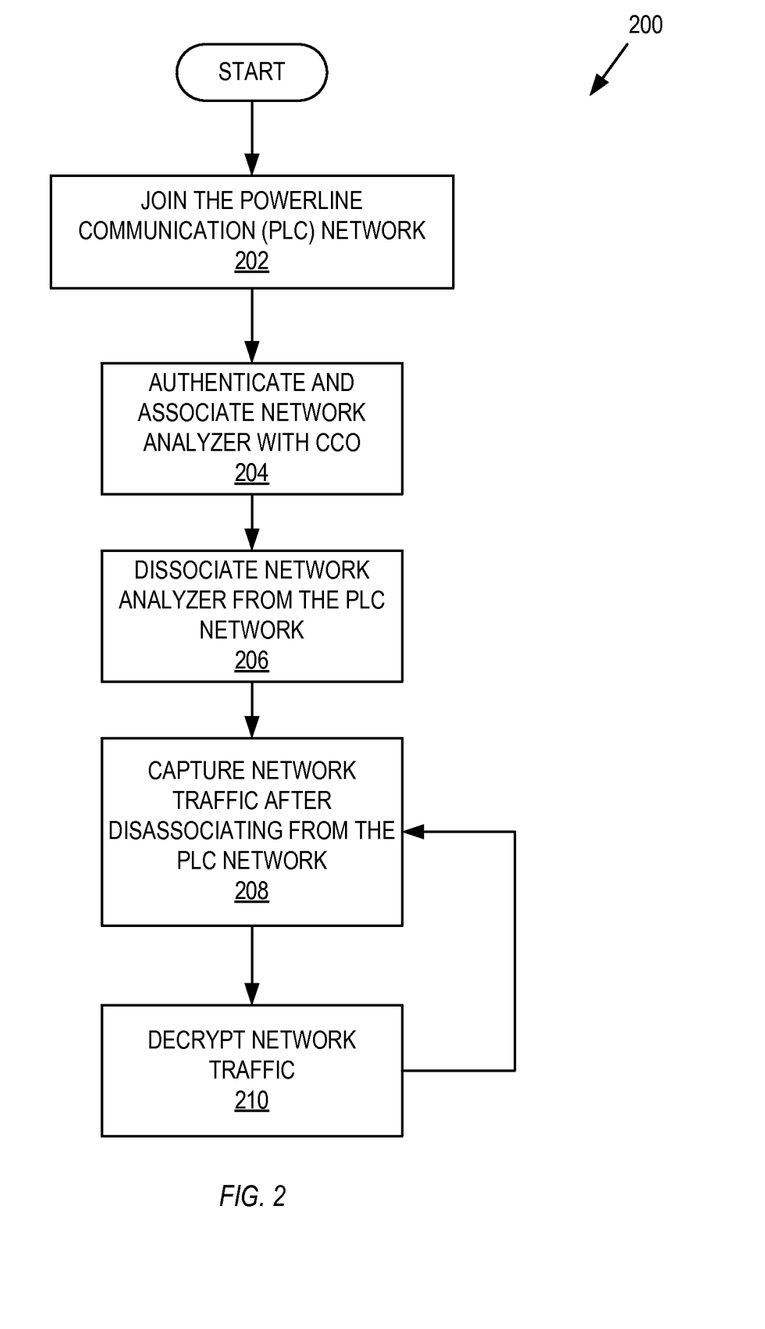
FIG. 2 is a flow diagram illustrating example operations for capturing powerline communication network traffic with the network analyzer.

FIG. 2 is a flow diagram 200 illustrating example operations for capturing PLC network traffic with the network analyzer 110. The operations of flow diagram 200 are described with reference to the PLC network 102 for illustration purposes and not as a limitation. The example operations can be performed by one or more components of a network analyzer 110 in the PLC network 102; for example, the operations can be performed by one or more of a network interface, a processor, and a memory of the network analyzer 110.

The flow begins at block 202, where the network analyzer 110 joins the PLC network 102. In one embodiment, the network analyzer 110 can provide an association request to the CCo 104 to join the PLC network 102. When the network analyzer 110 associates with the PLC network 102, the network analyzer 110 can receive a terminal equipment identifier (TEI) from the CCo 104. In one embodiment, the CCo 104 can use the TEI to identify the network analyzer 110. The flow continues to block 204.

At block 204, the network analyzer 110 authenticates and associates with the CCo 104 and becomes a member of the PLC network 102. In one embodiment, the network analyzer 110 can use the TEI to authenticate with the CCo 104. For example, the network analyzer 110 can use the TEI to receive a network membership key (NMK) from the CCo 104 and thereby authenticate and associate with the CCo 104. The NMK can be used as a master key in the distribution of a network encryption key (NEK) from the CCo 104. In one embodiment, the NMK and the NEK can collectively be referred to as the encryption key and can operate as network credentials. The encryption key can be used by members of the PLC network 102 to transmit (encrypt) and receive (decrypt) the network traffic. Flow continues to block 206.

At block 206, the network analyzer 110 dissociates from the PLC network 102. In one embodiment, the network analyzer 110 can dissociate from the PLC network 102 by sending a dissociation message to the CCo 104. The CCo 104 can send an acknowledgment the network analyzer 110 to confirm the dissociation. By dissociating from the PLC network 102, the CCo 104 and other devices such as the STA 106 can respond by not sending unicast communications to the network analyzer 110. However, the network analyzer 110 can retain access to the encryption key obtained earlier during authentication. Thus, the network analyzer 110 can continue to capture and decrypt the network traffic. The flow continues to block 208.

At block 208, the network analyzer 110 captures network traffic from the PLC network 102 after dissociating from the PLC network 102. For example, the network analyzer 110 can capture unicast network traffic that is addressed to the STA 106 and/or the CCo 104. In one embodiment, the network analyzer 110 can be configured to capture substantially all the network traffic, including traffic that is not directed to the network analyzer 110. That is, the network analyzer 110 can capture the network traffic with destination addresses that do not match the device address of the network analyzer 110. For example, the network analyzer 110 can monitor data transmitted to and received from the STA 106 (which can be the DUT). The flow continues to block 210.

At block 210, the network analyzer 110 decrypts the network traffic that has been captured. In one embodiment, the network analyzer 110 can decrypt the network traffic using the encryption key obtained from the CCo 104 during authentication. The flow can return to block 208 allowing the network analyzer 110 to capture additional network traffic. For example, the network analyzer 110 can capture and decrypt the network traffic to analyze the performance of the STA 106. In another example, the network analyzer 110 can capture and decrypt the network traffic to determine if any interference may be present in the PLC network.

By maintaining access to the encryption key (e.g., by storing the encryption key in a memory), the network analyzer 110 can have access to substantially all the network traffic transmitted through the PLC network 102. That is, the network analyzer 110 can capture and decrypt the network traffic from other members in the PLC network 102 without being a member of the PLC network itself. The network analyzer 110 can be "transparent" to other members of the PLC network 102 and can capture the network traffic independent of the intended recipient. In one embodiment, the network analyzer 110 can also join and dissociate from a second PLC network. Thus, the network analyzer 110 can capture and decrypt network traffic from multiple PLC networks at the same time.

In one embodiment, the network analyzer 110 can capture management message entry (MME) data packets transmitted through the PLC network 102. An MME data packet can include information related to STAs that are members of the PLC network 102. For example, the MME data packets can include information related to the capabilities, authentication, association, performance and other configuration information of a STA. In another embodiment, the network analyzer 110 can capture, decrypt, and decode vendor specific MME data packets transmitted through the PLC network 102. The MME data packets can include bit fields that represent the above-mentioned information. The network analyzer 110 can decode these bit fields and provide the information represented in the bit fields in a simplified format. For example, the network analyzer 110 can generate a report summarizing the information included in the bit fields. In another embodiment, the network analyzer 110 can capture, decrypt, and decode the MME data packets related to a HomePlug specification. In yet another embodiment, the network analyzer 110 can sort and filter the MME data packets. For example, the network analyzer 110 can filter the MME data packets and isolate only the MME data packets related to the DUT. Filtering the MME data packets can reduce the number of MME data packets that are captured, thereby simplifying the analysis provided by the network analyzer 110.

In one embodiment, the network analyzer 110 can operate in a "private mode." In the private mode, the network analyzer 110 can capture and decrypt substantially all MME data packets transmitted through the PLC network 102. A host program, that can be separate from the network analyzer 110, can analyze the captured MME data packets, and then characterize and debug the PLC network 102. Since the MME data packets are typically unicast to a particular STA or the CCo 104, the host program may not have access to some or all of the MME data packets. For example, if the host program is running on a STA, then the host program may not have access to unicast data MME data packets sent to the CCo 104. However, operating in the private mode, the network analyzer 110 can capture, sort, and filter substantially all the MME data packets, including the MME data packets that are transmitted to other STAs or to the CCo 104. The network analyzer 110 can provide the MME data packets to the host program. In one embodiment, the host program can be separate from the network analyzer 110 and can be executed by a device coupled to the PLC network 102. In another embodiment, the host program can run on a STA operating as the CCo 104. In still another embodiment, the host program can run on any feasible STA coupled to the PLC network 102. It is noted, however, that in other embodiments the host program can run within the network analyzer 110.

In another embodiment, the network analyzer 110 can capture frame control information transmitted through the PLC network 102. Frame control information can include, but is not limited to, start of frame data, beacon information, sounding packet information, tone map information, selective acknowledgement information and real time clock data. The frame control information can be used to analyze the operation of a PLC device in the PLC network 102. For example, the tone map information can be used to analyze PLC network performance by determining which tones a PLC device has selected to transmit the network traffic. In one embodiment, the network analyzer 110 can decode the frame control information and can enable a graphical display showing the decoded frame control information on a remote display device. In one embodiment, the remote display device may be coupled to the PLC network 102. In another embodiment, the remote display device may be part of the network analyzer 110.

In still another embodiment, the network analyzer 110 can capture parameter information block (PIB) data from a STA in the PLC network 102. The PIB data can include a configuration file with device specific characteristics such as device name, general device capabilities, and operational modes. In some embodiments, the operational modes can include a regular powerline mode (also referred to as a "non-private" mode), a coordinated low power mode, a signal level attenuation characterization (SLAC) mode, a Green PHY mode, an AV2 mode, etc. For example, the STA may be configured to provide network traffic to test the signal level attenuation characteristics when the STA operates in the SLAC mode. As another example, the STA may be configured to support HomePlug Green PHY testing when the STA operates in the Green PHY mode. As another example, the STA may be configured to support HomePlug AV2 testing when the STA operates in the AV2 mode. The PIB data is typically stored in a memory, such as a flash memory of the STAs. The network analyzer 110 can read and reprogram the flash memory of those STAs, including PIB data included in the network analyzer 110. In a similar manner, the network analyzer 110 can modify other items that may be stored in the memory of the STAs, such as a device access key (DAK) or the NMK. Modifying the PIB, the DAK, or the NMK can be useful when testing, debugging, or updating a PLC device. For example, the PIB can be modified to reflect newer parameters for a PLC device that can affect performance of the PLC device.

The network analyzer 110 can also provide a real-time network status of the STAs in the PLC network 102. For example, the network analyzer 110 can determine an operational role (CCo or STA) of the STAs during the operation of the PLC network 102. In some embodiments, the network analyzer 110 can also determine firmware versions of the STAs and the CCo 104.

In some embodiments, the network analyzer 110 can be implemented with a hardware platform similar to the hardware platform used to implement the CCo 104 or the STA 106. For example, the hardware platform used to implement the CCo 104 can be reconfigured to implement the network analyzer 110 by loading and executing software instructions to perform operations of the network analyzer 110.

In another embodiment, the network analyzer 110 can create and add one or more virtual STAs to the PLC network 102. The virtual STAs can interact with other PLC devices without the need to couple actual STAs to the PLC network 102. For example, the virtual STAs can be used to generate network traffic to test the DUT under simulated network conditions. The creation of the virtual STAs will be described further below in conjunction in FIG. 3.

Figure 3:
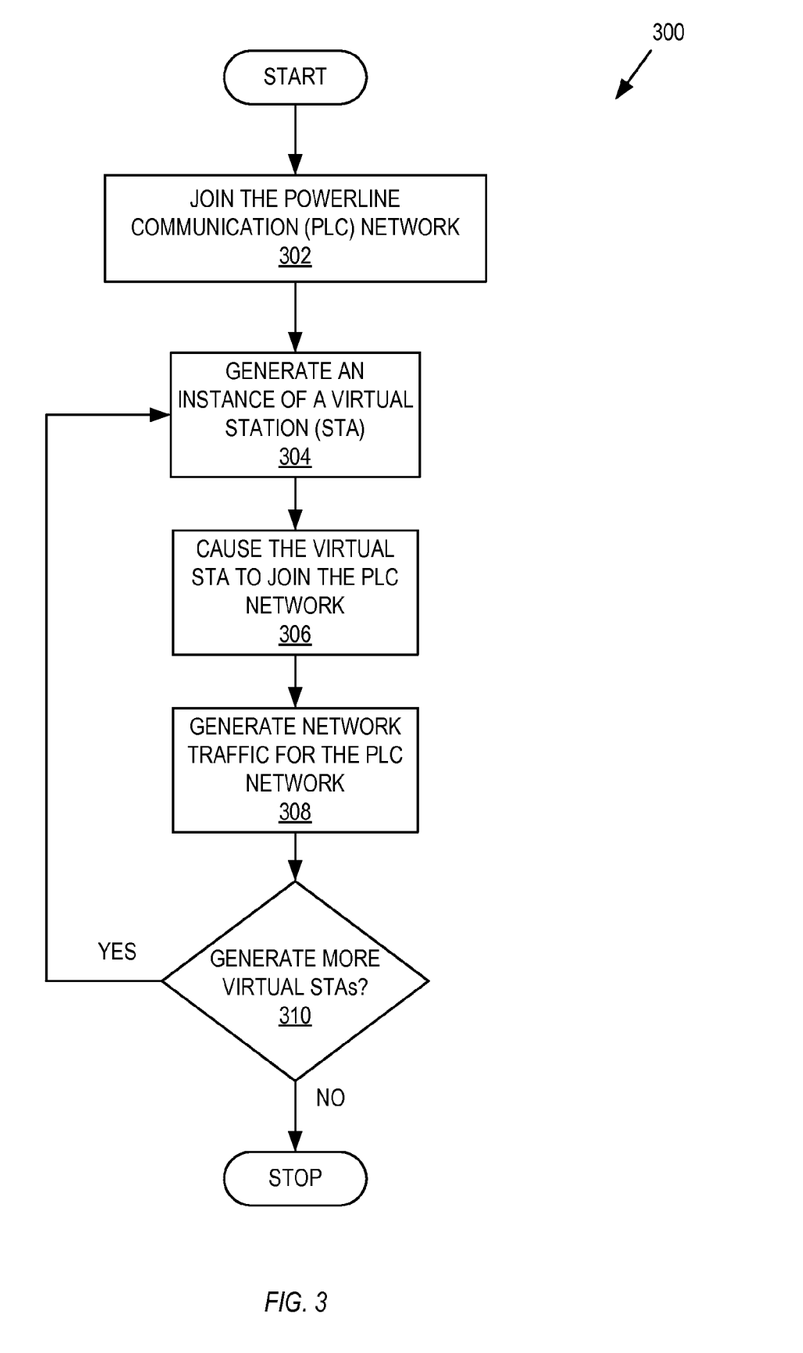
FIG. 3 is a flow diagram illustrating example operations for creating and operating one or more virtual stations with the PLC network.

FIG. 3 is a flow diagram 300 illustrating example operations for creating and operating one or more virtual STAs in the PLC network 102. The network analyzer 110 can create and operate the virtual STAs. In one embodiment, the virtual STAs can be implemented by a set of software instructions stored in a memory and executed by a processor included in the network analyzer 110. Each virtual STA can simulate operational behaviors of an actual STA. The virtual STA can join the PLC network 102 and interact with other members of the PLC network 102.

The flow begins at block 302, where the network analyzer 110 joins the PLC network 102. In one embodiment, the network analyzer 110 can join the PLC network 102 through associating and authenticating with the CCo 104 (e.g., as described at blocks 202 and 204 in FIG. 2). The flow continues to block 304.

At block 304, the network analyzer 110 generates an instance of a virtual STA. In one embodiment, the virtual STA can be modeled to include one or more operational behaviors of other PLC devices. In another embodiment, the virtual STA can include one or more operational features to test one or more aspects of the DUT. For example, the virtual STA can generate a particular network traffic pattern at a particular data rate to test the DUT. The virtual STA can include a configuration file, such as a PIB that can describe one or more device specific characteristics of the virtual STA. Generation of the instance of the virtual STA can include generating one or more files that can describe particular aspects of the virtual STA, such as bandwidth capabilities, manufacturer information, device name, MAC address, tone map and network traffic that can be exchanged with other devices in the PLC network 102. In one embodiment, the virtual STA can be generated by a program executed on a processor included in the network analyzer 110. The flow continues to block 306.

At block 306, the virtual STA joins the PLC network 102. The network analyzer 110 can communicate with the CCo 104 and request that the virtual STA join the PLC network 102. For example, using the configuration files created at block 304, the network analyzer 110 can communicate with the CCo 104 and can associate the virtual STA with the PLC network 102 and receive a TEI. The network analyzer 110 can use the TEI to authenticate the virtual STA with the CCo 104 and obtain the NMK and the NEK on behalf of the virtual STA. In one embodiment, the virtual STA can join the PLC network 102 when the network analyzer 110 performs similar operations as those described at block 202 and 204 of FIG. 2 on behalf of the virtual STA. The flow continues to block 308.

At block 308, the virtual STA generates network traffic for the PLC network 102. For example, the virtual STA can generate network traffic by transmitting and receiving network traffic with other members of the PLC network 102. In one embodiment, the network traffic for the virtual STA can be provided by the network analyzer 110 on behalf of the virtual STA. The flow continues to block 310.

At block 310, the network analyzer 110 can determine whether to generate more virtual STAs. In one example, the number of virtual STAs to create can be predetermined as part of a test procedure. In another example, the number of virtual STAs to create can be determined by an amount of desired network traffic. If a user desires more network traffic than is present in the PLC network 102 (e.g., to perform a test), then more virtual STAs can be created. In still another example, the network analyzer 110 can add virtual STAs to the PLC network 102 to determine a maximum number of STAs that can communicate with the DUT. For example, the network analyzer 110 can add 256 virtual STAs to the PLC network 102 to generate network traffic for the DUT. If the network analyzer 110 determines that more virtual STAs are to be created, then flow returns to block 304. If the network analyzer 110 determines not to create more virtual STAs, then the flow ends.

In one embodiment, the virtual STAs can be configured to send a variety of vendor specific MMEs through the PLC network 102 and to the DUT. The vendor specific MMEs can be used to test and debug the DUT. In another embodiment, one or more virtual STAs can be configured to generate network traffic to enable network performance testing. For example, the virtual STA can generate unidirectional and bidirectional communications for the PLC network 102 that include transmission control protocol (TCP) and user datagram protocol (UDP) network traffic. The TCP and UDP network traffic can be used to test and debug the DUT or another PLC device in the PLC network 102.

In another embodiment, the virtual STA can be configured to support HomePlug Green PHY testing. For example, one or more virtual STAs can be configured to provide network traffic to test signal level attenuation characteristics (SLAC), bandwidth control, and low power modes related to the HomePlug Green PHY specification.

In still another embodiment, the virtual STA can also be configured to test multiple-input multiple-output (MIMO) data streams specified in the HomePlug AV2 specification. For example, one or more virtual STAs can be configured to generate and/or receive the MIMO data streams. The network analyzer 110 can capture and decrypt network traffic on the PLC network 102 and can analyze the MIMO data performance of the DUT.

FIGS. 1-3 and the operations described herein are examples meant to aid in the understanding of the embodiments and should not be used to limit the scope of the embodiments or the claims. Embodiments may perform additional operations, fewer operations, operations in a different order, operations in parallel, and some operations differently. For example, determining whether to create additional virtual STAs at block 310 can be performed before generating the network traffic at block 308. The disclosed embodiments are not meant to be limiting. Other embodiments are contemplated.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module", "unit," "device," or "system." Furthermore, aspects of the present disclosure may take the form of a computer program product embodied in one or more computer readable medium(s) having computer readable program code embodied thereon.

Any combination of one or more computer readable medium(s) may be used. The computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples of the computer readable storage medium may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The computer readable medium can include instructions for carrying out operations for aspects of the present disclosure and may be written in any combination of one or more programming languages. Examples of programming languages can include an object oriented programming language such as Java, Smalltalk, C++, or the like and conventional procedural programming languages, such as the "C" programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to be executed.

The computer program instructions can be executed to direct a computer, other programmable data processing apparatus, or other devices to function in a particular manner in order to produce an article of manufacture including instructions, which implement the function/act specified in the flowchart and/or block diagram block or blocks.

The computer program instructions may also be loaded onto a computer, other programmable data processing apparatus, or other devices. The computer program instructions can be executed to cause a series of operational steps to be performed to produce a computer implemented process such that the executed instructions can provide processes for implementing the functions/acts specified in the flowchart and/or block diagram block or blocks.

Figure 4:
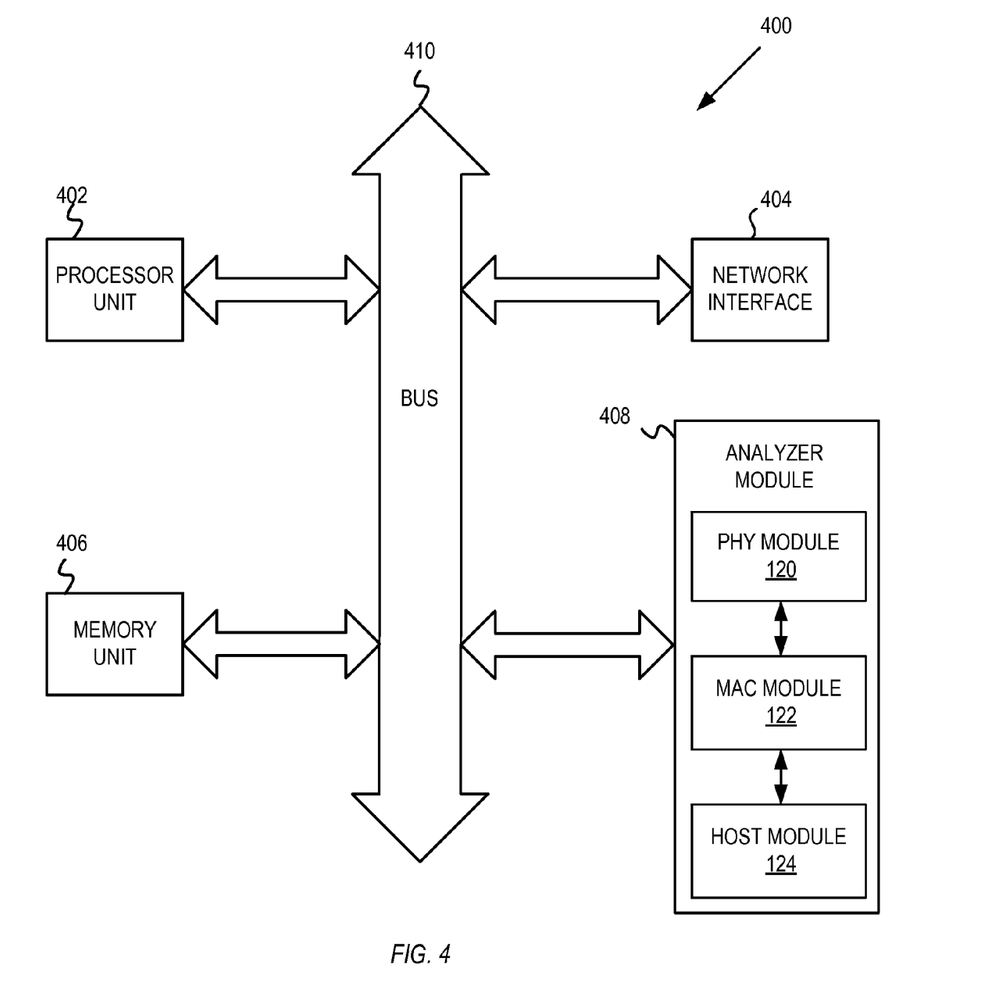
FIG. 4 is a block diagram of an exemplary embodiment of an electronic device including a network analyzer.

FIG. 4 is a block diagram of an exemplary embodiment of an electronic device 400 including an analyzer module 408. In some implementations, the electronic device 400 may be one of a laptop computer, a tablet computer, a mobile phone, a powerline communication device, a smart appliance (PDA), an access point, a wireless station or other electronic system that is configured as a network analyzer (e.g., network analyzer 110). The electronic device 400 can include a processor unit 402 (possibly including multiple processors, multiple cores, multiple nodes, and/or implementing multi-threading, etc.). The electronic device 400 can also include a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 400 can include a bus 410 (e.g., PCI, ISA, PCI-Express, HyperTransport®, InfiniBand®, NuBus, AHB, AXI, etc.). The electronic device 400 can include a network interface 404 that includes at least one of a wireless network interface (e.g., a WLAN interface, a BLUETOOTH® interface, a WiMAX interface, a ZigBee® interface, a Wireless USB interface, etc.) and a wired network interface (e.g., an Ethernet interface, a powerline communication interface, etc.). In some implementations, the electronic device 400 may support multiple network interfaces—each of which is configured to couple the electronic device 400 to a different communication network.

The analyzer module 408 can include the MAC module 122, the PHY module 120, and the host module 124. The PHY module 120 can provide a physical layer interface to the PLC network 102. For example, the PHY module 120 can include one or more elements (not shown) to couple signals between the electronic device 400 and the powerline medium 108 such as, but not limited to, low noise amplifiers, filters, analog-to-digital converters, fast-Fourier transform (FFT) units, mappers and de-mappers and any other technically feasible elements to couple signals to and from the powerline medium 108. The PHY module 120 can be coupled to the MAC module 122. In one embodiment, the MAC module 122 can provide an interface between the PHY module 120 and higher level units within the analyzer module 408 that receive or generate network traffic. The MAC module 122 can provide unicast and broadcast communications by using protocols that schedule access to the PLC network 102. The MAC module 122 can be coupled to the host module 124. In one embodiment, the host module 124 can capture and decrypt the network traffic provided by the MAC module 122. For example, the host module 124 can decrypt the captured MME data packets to debug performance of the PLC network 102. In another embodiment, the host module 124 can support one or more virtual STAs. For example, the host module 124 can generate network traffic for the virtual STA and provide the network traffic to the MAC module 122. In some embodiments, portions of the analyzer module 408 can be distributed within the processor unit 402, the memory unit 406, the network interface 404, and the bus 410.

The memory unit 406 can include computer instructions executable by the processor unit 402 to implement the functionality of the embodiments described in FIGS. 1-4 above. In one embodiment, the memory unit 406 can include instructions for capturing and decrypting network traffic from the PLC network 102 as described in FIG. 2 and creating one or more virtual stations as described in FIG. 3.

Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.). The processor unit 402, the memory unit 406, the network interface 404 are coupled to the bus 410. Although illustrated as being coupled to the bus 410, the memory unit 406 may be coupled to the processor unit 402.

While the embodiments are described with reference to various implementations and exploitations, it will be understood that these embodiments are illustrative and not limiting. In general, techniques for implementing a network analyzer for a PLC network 102 as described herein may be implemented with facilities consistent with any hardware system, or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
   receiving, by a network analyzer, an encryption key associated with a powerline communication (PLC) network from a central coordinator of the PLC network in response to the network analyzer joining the PLC network;
   dissociating the network analyzer from the PLC network;
   capturing, by the network analyzer, network traffic from the PLC network after dissociating from the PLC network; and
   decrypting, by the network analyzer, the network traffic using the encryption key.

2. The method of claim 1, wherein the network traffic decrypted by the network analyzer includes unicast traffic that is not destined for the network analyzer.

3. The method of claim 1, wherein dissociating the network analyzer from the PLC network comprises receiving an acknowledgement from the central coordinator confirming the dissociation.

4. The method of claim 1, wherein the network traffic decrypted by the network analyzer includes a management message entry (MME) data packet that is destined for at least one member selected from the group consisting of: a PLC station of the PLC network and the central coordinator.

5. The method of claim 1, wherein joining the PLC network comprises associating and authenticating the network analyzer with the central coordinator.

6. The method of claim 1, wherein the network analyzer is configured to implement at least one member selected from the group consisting of: a HomePlug, a HomePlug AV, a HomePlug AV2, a HomePlug Green PHY, and an IEEE 1901 specification.

7. The method of claim 1, further comprising:
   generating an instance of a virtual station at the network analyzer;
   associating the virtual station with the central coordinator; and
   generating additional network traffic associated with the virtual station between the network analyzer and the central coordinator.

8. The method of claim 7, wherein the additional network traffic generated by the network analyzer includes configuration information associated with the virtual station.

9. The method of claim 7, wherein associating the virtual station includes authenticating the virtual station with the central coordinator and receiving the encryption key from the central coordinator.

10. A network analyzer comprising:
    a network interface configured to couple the network analyzer to a powerline medium; and
    an analyzer module coupled with the network interface, the analyzer module configured to:
      join a powerline communication (PLC) network through the powerline medium;
      receive an encryption key associated with the PLC network;
      dissociate from the PLC network;
      capture network traffic from the PLC network after dissociating from the PLC network; and
      decrypt the network traffic using the encryption key.

11. The network analyzer of claim 10, wherein the network traffic decrypted by the analyzer module includes unicast traffic that is not destined for the network analyzer.

12. The network analyzer of claim 10, wherein the analyzer module is configured to dissociate from the PLC network by receiving an acknowledgment from a central coordinator confirming the dissociation.

13. The network analyzer of claim 10, wherein the network traffic decrypted by the analyzer module includes a management message entry (MME) data packet transmitted by at least one member selected from the group consisting of: a PLC station and a central coordinator.

14. The network analyzer of claim 10, wherein the encryption key includes at least one of a network membership key and a network encryption key.

15. The network analyzer of claim 10, wherein the network interface is configured to implement at least one member selected from the group consisting of a HomePlug, a HomePlug AV, a HomePlug AV2, a HomePlug Green PHY and an IEEE 1901 specification.

16. The network analyzer of claim 10, wherein the analyzer module is further configured to:
    generate an instance of a virtual station at the network analyzer;
    associate the virtual station with a central coordinator of the PLC network; and
    generate additional network traffic associated with the virtual station between the network analyzer and the central coordinator.

17. The network analyzer of claim 16, wherein the analyzer module is further configured to associate the virtual station by authenticating with the central coordinator and receiving the encryption key.

18. A non-transitory machine-readable storage medium having machine executable instructions stored therein, the machine executable instructions comprising instructions to:
- receive, by a network analyzer, an encryption key associated with a powerline communication (PLC) network from a central coordinator of the PLC network in response to the network analyzer joining the PLC network;
- dissociate the network analyzer from the PLC network;
- capture network traffic from the PLC network after dissociating from the PLC network; and
- decrypt the network traffic using the encryption key.

19. The non-transitory machine-readable storage medium of claim 18, wherein the instructions to dissociate the network analyzer from the PLC network comprise instructions to receive an acknowledgement from the central coordinator confirming the dissociation.

20. The non-transitory machine-readable storage medium of claim 18, further comprise instructions to:
- generate an instance of a virtual station at the network analyzer;
- associate the virtual station with the central coordinator; and
- generate additional network traffic associated with the virtual station between the virtual station and the central coordinator.

* * * * *